Nov. 14, 1967 J. J. SAELI 3,353,079
WINDSHIELD WIPER CONTROL SYSTEM
Filed Oct. 7, 1964

INVENTOR.
JOHN J. SAELI
BY
W. E. Finke
HIS ATTORNEY 3,353,079
WINDSHIELD WIPER CONTROL SYSTEM
John J. Saeli, Rochester, N.Y., assignor to General
 Motors Corporation, Detroit, Mich., a corporation
 of Delaware
Filed Oct. 7, 1964, Ser. No. 402,089
10 Claims. (Cl. 318—443)

ABSTRACT OF THE DISCLOSURE

This invention relates to a variable pulsed type windshield wiper control system wherein the wiper drive motor is connected across a potential source through the parallel combination of a semiconductor switch and a mechanical parking switch having a pair of normally open contacts operated by the wiper drive motor. The control electrode of the semiconductor switch is connected to a timing circuit which produces control signals therefor at selectable intervals of time. Upon the occurrence of a control signal, the semiconductor switch is triggered conductive thereby to establish an energizing circuit for the wiper drive motor. The operating wiper drive motor closes the normally open contacts of the parking switch to provide an auxiliary energizing circuit for the wiper drive motor in parallel with the semiconductor switch and to reduce the holding current through the semiconductor switch below the minimum required value thereby extinguishing this device. The wiper drive motor remains energized through the auxiliary energizing circuit and, therefore, continues to operate until it has reached substantially the parked position at which time it operates the parking switch contacts to open to interrupt the auxiliary energizing circuit. The wiper drive motor remains energized until the timing circuit produces the next control signal which triggers the semiconductor switch conductive to initiate another sequence.

This invention pertains to windshield cleaning systems, and particularly to an improved control system for an electric motor operated windshield wiper unit.

Heretofore, it has been proposed to control a windshield cleaning system of the electric motor driven type with a thermal timer so as to obtain automatic intermittent operation of the wiper mechanism. A control system of the aforesaid type is disclosed in Patent #3,091,792 wherein the wiper mechanism can be operated continuously or intermittently, and when intermittently operated wiping strokes are followed by timed rest intervals whereat the wiper blades are automatically arrested in their parked positions. Automatic intermittent operation of the wiper mechanism prevents the impairment of vision through the windshield under conditions of very mild precipitation.

It has also been proposed to have a completely automatic windshield cleaning system including means responsive to the surface condition of the windshield for controlling the interval of wiper operation with intervening rest periods, progressively reducing the number of wipe cycles as the windshield is dried, and automatically terminating wiper operation when the windshield is substantially completely dry. A system of the latter type is disclosed in copending application Ser. No. 270,024, now Patent No. 3,148,399, filed Apr. 2, 1963, in the name of Eugene R. Ziegler, of common assignee. The present invention relates to a pulse type windshield wiper control system wherein the number of wiping cycles, or strokes, can be infinitely varied by a manual control. Thus, with the pulse control system of the present invention the wiper blades are operated at the same speed irrespective of the intervening rest interval between successive wiper cycles, and the rest interval can be infinitely varied so as to maintain a clear vision through the windshield. Moreover, the single control can be set at a position which will result in continuous wiper operation with no intervening rest intervals.

Accordingly, among my objects are the provision of a windshield wiper control system for effecting either intermittent or continuous operation; the further provision of a windshield wiper control system for effecting intermittent operation of the wiper and wherein the rest intervals between successive wiper cycles are infinitely variable between zero to a predetermined maximum time interval; and the still further provision of a windshield wiper control system of the aforesaid type including a manually adjustable timing circuit for selecting the rest interval between the successive wiping cycles and wherein the wiper is automatically parked during each rest interval.

The aforementioned and other objects are accomplished in the present invention by embodying a variable resistor in a resistor-condenser timing circuit for controlling the conduction of a silicon controlled rectifier connected in the energizing circuit for an electric wiper motor. The control system comprehends the use of a single manual control for operating a manual "on-off" switch as well as varying the resistance in the resistor-condenser timing circuit, in combination with a wiper motor operated parking switch which is actuated during each cycle of wiper operation.

Further objects and advantages of the present invention will be apparent from the following description, reference being had to the accompanying drawing, wherein preferred embodiments of the present invention are clearly shown, and wherein similar numerals depict similar parts throughout the several views.

Figure 1:
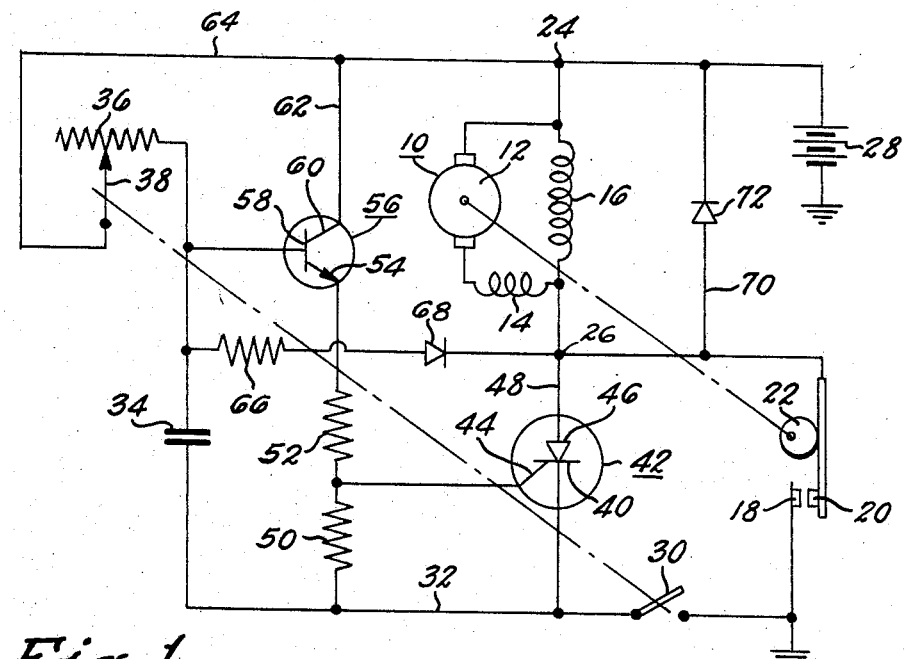
FIGURE 1 is a schematic circuit diagram of the preferred embodiment of a pulse type windshield wiper control system.

Referring to the drawing, both embodiments of the pulse type wiper control system are disclosed with a direct current electric windshield wiper motor 10 having a wound armature 12, a series field winding 14 and a shunt field winding 16. However, it is to be understood that the control system is equally adaptable for use with a permanent magnet motor. The wiper motor embodies a cyclically actuated parking switch comprising a pair of leaf spring carried contacts 18 and 20 which are inherently biased into engagement with each other and motor driven cam means 22 for separating the contacts 18 and 20 during each cycle of wiper blade movement. When the parking switch comprising contacts 18 and 20 is open, movement of the wiper blades will be arrested at their parked positions adjacent the lower rail of the windshield. Structurally, the parking switch may be of the type shown in Patent #3,059,264. The motor includes terminals 24 and 26, the terminal 24 being connected to the positive terminal of a battery 28, the negative terminal of which is grounded.

Referring particularly to FIGURE 1, the preferred wiper control system includes a manual "on-off" switch 30, which in accordance with general practice may be actuated by the rotatable knob. One terminal of the switch 30 is connected to ground and the other terminal is connected to a wire 32 which connects with a timing circuit comprising a condenser 34 connected in series with a potentiometer 36 having an adjustable slider 38, the position of which can be varied by rotation of the knob for controlling the manual switch 30 through a suitable drive mechanism. The wire 32 is also connected to a cathode 40 of a silicon controlled rectifier 42 having a gate 44 and an anode 46, the anode 46 being connected by wire 48 to the motor terminal 26. The gate 44 of the silicon controlled rectifier 42 is connected across a voltage divider network comprising resisotrs 50 and 52 which are connected between the wire 32 and the emitter 54 of an NPN transistor 56 having a base electrode 58 connected between the potentiometer 36 and the condenser 34 and a collector electrode 60 connected by wire 62 to a wire 64. Wire 64 connects with the potentiometer slider 38 and with the motor terminal 24.

When the manual switch 30 is closed, the timing circuit comprising the lower portion of the potentiometer 36 and condenser 34 is energized, and in accordance with the setting of the slider 38 the resistor-condenser network will have a predetermined charging rate, or time constant. The condenser voltage will appear across the voltage divider network comprising resistors 50 and 52 due to the emitter follower action of transistor 56. When the voltage across the resistor 50 is sufficient to render the silicon controlled rectifier 42 conductive, the circuit from the battery 28 through the motor and the silicon controlled rectifier will be completed, and the motor will run at its maximum speed. Thus, the silicon controlled rectifier functions as a semiconductor switch. As soon as the motor is energized, the parking switch comprising contacts 18 and 20 will be closed for one complete wiper cycle, and hence the total motor current will be transferred from the silicon controlled rectifier 42 through the parking switch contacts thus turning off the silicon controlled rectifier by reducing the current flow therethrough to a value below its holding current. Concurrently, the condenser 34 will discharge through resistor 66, diode 68, the silicon controlled rectifier 42 and the parking switch contacts 18 and 20.

After each complete wiper cycle the blades return to their parked position and the parking switch contacts 18 and 20 will be opened. Since the silicon controlled rectifier is in a nonconducting state the motor 10 will be deenergized. At this time the condenser 34 will re-initiate its charging cycle through the potentiometer 36. The slider 38 of the potentiometer 36 is adjustable to vary the time constant of the resistor-condenser combination from zero seconds to approximately twenty-five seconds, which determines the time duration of the rest interval between successive wiper cycles. Thus, with the slider 38 adjusted for zero off time, the wiper will operate continuously at its maximum speed. If the resistance in the timing circuit is increased, the rest interval will be of progressively longer duration, and it is pointed out that these rest intervals are infinitely variable between zero seconds and twenty-five seconds in the disclosed circuits. Moreover, at all times when the wiper is operating, it is operating at its maximum speed so as to eliminate blade chatter. The diode 72 connected in series with the parking switch contacts functions as a spark suppressor.

Figure 2:
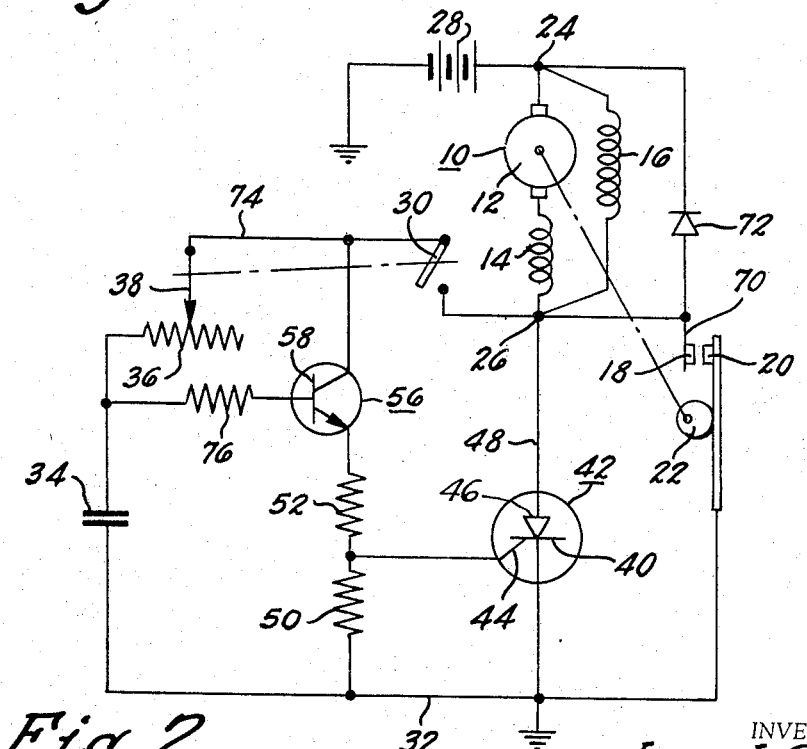
FIGURE 2 is a schematic circuit diagram of another embodiment of a pulse type windshield wiper control system.

Referring to FIGURE 2, in the modified embodiment of the wiper control system, the manual control switch 30 is connected directly to the motor terminal 26 with its other resistor connected by wire 74 to the slider 38 of the potentiometer 36. In this embodiment the base electrode 58 of the transistor 56 is connected through a resistor 76. The silicon controlled rectifier 40 has its gate 44 connected by the resistors 50 and 52, while its cathode 40 is connected to ground. The triggering circuit for the silicon controlled rectifier includes the resistor-condenser network 34, 36, 38. Operation of the modified embodiment of FIGURE 2 is substantially the same as in the preferred embodiment except that the discharge path for the condenser is through the base and emitter electrodes of the transistor 56, the resistor 52, and the silicon controlled rectifier.

In both embodiments of the improved pulse type wiper control system infinitely variable wiper rates can be achieved without blade chatter since when the wiper operates it runs at full speed. Moreover, whenever the wiper is being intermittently operated, the "on" time is less than with a conventional variable speed wiper system. The semiconductor control device, namely the silicon controlled rectifier, has low heat dissipation since it is only used at an interrupter switch to initiate wiper motor operation, while the parking switch carries the full wiper motor current during each wiper cycle.

In addition, by utilizing a pulse controlled wiper system having a minimal number of components, economies can be effected inasmuch as single speed motors can be utilized to obtain the same effect as a multiple speed motor with continuously variable wiper rate control. Moreover, maximum torque is available at each and every wiper rate setting, and the range of wiper rate can be readily selected to meet any particular environmental conditions by component selection in the resistor-condenser timing circuit.

While the embodiments of the invention as herein disclosed constitute preferred forms, it is to be understood that other forms might be adopted.

What is claimed is as follows:

1. Windshield wiper control mechanism for a wiper movable back and forth across the surface of a windshield including, an electric motor operable to oscillate the wiper and park the wiper in a predetermined position, an electric power source, an energizing circuit for said motor including a cyclically actuated parking switch operated by said motor, interrupter means connected in parallel with said parking switch in said energizing circuit, variable timing means connected in circuit with said interrupter means, and a manual control connected with said power source and said timing means for varying the time constant of said timing means to effect a one cycle operation of said wiper motor with the time interval between successive cycles of wiper operation being infinitely variable between zero and a predetermined maximum time interval.

2. A pulse control system for a wiper operable by an electric motor including, an electric power source, an energizing circuit for said motor including a cyclically actuated parking switch driven by said motor, the energizing circuit for said motor being completed when the parking switch is closed and interrupted when the parking switch is open, semiconductor switch means connected in the energizing circuit of said motor in parallel with said parking switch, an energizing circuit for said semiconductor switch means including a variable timing circuit, and a manual control connected in said timing circuit for varying the time constant thereof whereby said semiconductor switch means will effect cyclic operation of said wiper motor with the rest interval between successive cycles of wiper motor operation being infinitely variable between zero and a predetermined maximum time interval in accordance with the time constant setting of said timing circuit.

3. A windshield wiper control mechanism for a wiper movable back and forth across the surface of a windshield including, an electric motor operable to oscillate said wiper and park the wiper in a predetermined position, an electric power source, an energizing circuit for said motor including a cyclically actuated parking switch operated by said motor, semiconductor switch means connected in parallel with said parking switch in said energizing circuit, and a manually settable timing circuit energized from said power source and connected in circuit with said semiconductor switch means for periodically actuating said semiconductor switch means to effect a single cycle of wiper motor operation with the time interval between successive cycles of wiper motor operation being variable in accordance with the manual setting.

4. Windshield wiper control mechanism for a wiper movable back and forth across the surface of a windshield including, an electric motor operable to oscillate the wiper and park the wiper in a predetermined position, an electric power source, an energizing circuit for said motor including a cyclically actuated parking switch operated by said motor, semiconductor switch means connected in parallel with said parking switch in said energizing circuit, and a resistor-condenser timing circuit connected with said semiconductor switch means for periodically energizing said semiconductor switch means to effect a single cycle of wiper motor operation, said resistor-condenser circuit including a manually controlled variable resistor for adjusting the time constant thereof so as to infinitely vary the rest interval between successive cycles of wiper motor operation.

5. The windshield wiper control mechanism set forth in claim 4 wherein said semiconductor switch means comprise a silicon controlled rectifier.

6. The windshield wiper control mechanism set forth in claim 5 wherein said silicon controlled rectifier includes a gate circuit connected to said resistor-condenser circuit.

7. The windshield wiper control mechanism set forth in claim 6 wherein said gate circuit comprises a voltage divider and a transistor connected across said resistor-condenser circuit.

8. A pulse control system for a wiper operable by an electric motor including, an electric power source, an energizing circuit for said motor including a cyclically actuated parking switch driven by said motor, the energizing circuit for said motor being completed when the parking switch is closed and interrupted when the parking switch is open, semiconductor switch means connected in said energizing circuit in parallel with said parking switch, an energizing circuit for said semiconductor switch means including a timing circuit, and a manual control switch connected in said timing circuit for energizing the same whereby said timing circuit will periodically energize said semiconductor switch means to effect cyclic operation of said wiper motor, and manual means for varying the time constant of said timing circuit to infinitely vary the rest interval between successive cycles of wiper motor operation.

9. A pulse control system for a wiper operable by an electric motor including, an electric power source, an energizing circuit for said motor including, a cyclically actuated parking switch driven by said motor, said energizing circuit for said motor being completed when the parking switch is closed and interrupted when the parking switch is open, a silicon controlled rectifier connected in said energizing circuit and parallel with said parking switch, a triggering circuit connected to said silicon controlled rectifier including a resistor-condenser network having a variable time constant, and a manual control for energizing said triggering circuit and varying the time constant thereof to effect intermitent operation of said silicon controlled rectifier to effect cyclic operation of said wiper motor with the rest interval between successive cycles of wiper motor operation being determined by the adjustment of said time constant.

10. The pulse control system set forth in claim 9 wherein said triggering circuit includes a voltage divider network and a transistor operating in the emitter-follower mode.

References Cited
UNITED STATES PATENTS 3,219,901 11/1965 Forman et al. ........ 318—443
3,262,042 7/1965 Amos ............... 318—443

ORIS L. RADER, *Primary Examiner.*

J. J. BAKER, *Assistant Examiner.*

Disclaimer 3,353,079.—*John J. Saeli*, Rochester, N.Y. WINDSHIELD WIPER CONTROL SYSTEM. Patent dated Nov. 14, 1967. Disclaimer filed Dec. 4, 1970, by the assignee, *General Motors Corporation*.
Hereby enters this disclaimer to claim 1 of said patent.
[*Official Gazette February 16, 1971*].